United States Patent
Kristoffersen

(10) Patent No.: US 10,669,986 B2
(45) Date of Patent: Jun. 2, 2020

(54) RELATING TO THE DETERMINATION OF ROTOR IMBALANCES IN A WIND TURBINE

(71) Applicant: VESTAS WIND SYSTEMS A/S, Aarhus N (DK)

(72) Inventor: Jacob Krogh Kristoffersen, Viby J (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 338 days.

(21) Appl. No.: 15/507,891

(22) PCT Filed: Aug. 28, 2015

(86) PCT No.: PCT/DK2015/050250
§ 371 (c)(1),
(2) Date: Mar. 1, 2017

(87) PCT Pub. No.: WO2016/034180
PCT Pub. Date: Mar. 10, 2016

(65) Prior Publication Data
US 2017/0241404 A1    Aug. 24, 2017

(30) Foreign Application Priority Data
Sep. 1, 2014   (DK) ................................ 2014 70527

(51) Int. Cl.
*F03D 7/02*        (2006.01)
*F03D 17/00*       (2016.01)
(Continued)

(52) U.S. Cl.
CPC ............ *F03D 7/0224* (2013.01); *F03D 1/06* (2013.01); *F03D 7/0296* (2013.01); *F03D 7/042* (2013.01);
(Continued)

(58) Field of Classification Search
CPC ...... F03D 7/0224; F03D 7/0296; F03D 7/042; F03D 13/35; F03D 17/00; F05B 2260/966;
(Continued)

(56) References Cited

U.S. PATENT DOCUMENTS 8,202,049 B2 *  6/2012  Rogers ................. F03D 7/0224
                                              416/1
8,672,625 B2 *  3/2014  Becker ................. F03D 7/0224
                                              416/1
(Continued)

FOREIGN PATENT DOCUMENTS

CN    101523048 A    9/2009
CN    101720387 A    6/2010
(Continued)

OTHER PUBLICATIONS

International Search Report for PCT/DK2015/050250, dated Nov. 24, 2015.
(Continued)

*Primary Examiner* — Patrick Hamo
*Assistant Examiner* — Joseph S. Herrmann
(74) *Attorney, Agent, or Firm* — Patterson + Sheridan, LLP

(57) ABSTRACT

A method and system for improving the balance of a rotor in a wind turbine, including; determining blade load data associated with a selected rotor blade pair; determining, based on the blade load data, pitch imbalance data associated with the selected rotor blade pair, wherein the pitch imbalance data associated with a rotor blade pair is based on measurements of at least blade loading, rotor speed and wind speed; and, determining and applying pitch control inputs to one or both of the selected rotor blade pair in order to reduce the severity of the rotor imbalance.

10 Claims, 4 Drawing Sheets

(51) Int. Cl.
*F03D 1/06* (2006.01)
*F03D 7/04* (2006.01)

(52) U.S. Cl.
CPC ........ *F03D 17/00* (2016.05); *F05B 2260/966* (2013.01); *F05B 2270/331* (2013.01); *Y02E 10/721* (2013.01); *Y02E 10/723* (2013.01)

(58) Field of Classification Search
CPC . F05B 2270/331; Y02E 10/721; Y02E 10/723
See application file for complete search history.

(56) References Cited

U.S. PATENT DOCUMENTS

| | | | | |
|---|---|---|---|---|
| 8,946,916 | B2* | 2/2015 | Tarnowski | F03D 7/0276 |
| | | | | 290/44 |
| 9,556,850 | B2* | 1/2017 | Goodman | F03D 7/0224 |
| 9,970,413 | B2* | 5/2018 | Zaib | F03D 7/0224 |
| 10,161,383 | B2* | 12/2018 | Pineda Amo | F03D 7/0224 |
| 2010/0014969 | A1* | 1/2010 | Wilson | F03D 7/0224 |
| | | | | 416/1 |
| 2011/0229300 | A1 | 9/2011 | Kanev et al. | |
| 2012/0183399 | A1 | 7/2012 | Perkinson | |
| 2012/0230820 | A1 | 9/2012 | Frydendal et al. | |
| 2013/0134711 | A1* | 5/2013 | Spruce | F03D 7/0224 |
| | | | | 290/44 |
| 2013/0294911 | A1 | 11/2013 | Egedal | |
| 2014/0003939 | A1 | 1/2014 | Adams et al. | |
| 2017/0074243 | A1* | 3/2017 | Baba | F03D 7/042 |

FOREIGN PATENT DOCUMENTS

| | | |
|---|---|---|
| CN | 102102630 A | 6/2011 |
| CN | 102338034 A | 2/2012 |
| CN | 102486158 A | 6/2012 |
| CN | 102678453 A | 9/2012 |
| CN | 103573552 A | 2/2014 |
| EP | 2497946 A1 | 9/2012 |
| EP | 2693049 A2 | 2/2014 |
| WO | 2010016764 A1 | 2/2010 |
| WO | 2013182200 A1 | 12/2013 |

OTHER PUBLICATIONS

Danish Search Report for PA 2014 70527, dated Mar. 27, 2015.
SIPO of the People's Republic of China Notification of the First Office Action dated Jul. 26, 2018 for Application No. 201580054532.6.
Chinese Office Action for Application No. 20150054532.6 dated Sep. 9, 2019.

* cited by examiner

RELATING TO THE DETERMINATION OF ROTOR IMBALANCES IN A WIND TURBINE

FIELD OF THE INVENTION

The present invention relates to a technique, strategy or process for determining imbalance in a rotor of a wind turbine.

BACKGROUND TO THE INVENTION

Wind turbines are being designed ever larger due to the economic and political incentives to increase energy production from renewable resources.

As the overall size of wind turbines increase, so too do the forces experienced by the wind turbines in operation. One significant factor in tower loading is the force generated due to the motion of the rotor mounted to the nacelle of the wind turbine. In ideal circumstances, the rotor would be balanced so as to minimise the forces applied to the tower by this source of excitation. However, in practice, the rotor generates cyclical forces on the tower due to two principle causes: aerodynamic imbalance and mass imbalance. Aerodynamic imbalance can occur when the aerodynamic properties of the blades are affected, for example when one or more of the blades are mounted incorrectly, when one blade is dirtier than the others, or when ice-build up on one of the blades is more severe. Aerodynamic imbalance can also occur when turbulent regions of airflow passing through the rotor plane affect the blades unequally. Mass imbalance can occur when the mass of the blades are affected, for example if the mass of the blades are different at installation, or due to water accumulation in the interior of the blades.

The tower will oscillate in accordance with its natural frequency or 'eigenfrequency' which is determined largely by structural features of the wind turbine such as its height, diameter, material of fabrication, nacelle mass to name a few factors. Typically, a wind turbine will be designed such that the eigenfrequency of the tower is spaced, in the frequency domain, from the operational speed range of the rotor and associated generating equipment. However, this design principle means that the influence of rotor imbalance on the tower is difficult to detect and quantify, the result being that important components of the system, such as the rotor bearings, generating equipment and the like are subject to unbalanced forces that can have a detrimental impact on their service life.

Some efforts have been made to diagnose rotor imbalance for wind turbines. In one study, as documented in "Caselitz, P., Giebhardt, J.: Rotor Condition Monitoring for Improved Operational Safety of Offshore Wind Energy Converters. ASME Journal of Solar Energy Engineering 2005, 127, p253-261", a statistical approach is taken to diagnose a mass imbalance between the blades of a wind turbine. In particular, this approach applies a 'learning phase' over a significant time period (presented as three months) during which the system monitors the power output and wind speed conditions in order to define a power characteristic for a 'faultless' rotor. Further measurements are then taken to identify any departure from the 'faultless' characteristic in order to identify that a problem exits with the rotor. Instrumentation in the form of nacelle-mounted accelerometers then provide data which is analysed to determine if a mass imbalance exists between the blades of the rotor. Although such a scheme appears to provide an approach which offers the potential to diagnose blade imbalance conditions, in practice it is impractical due to the need for the learning phase to characterise a 'faultless' rotor, and due to its reliance on the assumption that the rotor as installed will indeed be faultless. A further challenge is how to separate out the effects of mass imbalance and pitch imbalance on the statistical data.

It is against this background that the invention has been devised.

SUMMARY OF THE INVENTION

In a first aspect, the invention provides a method of improving the balance of a rotor in a wind turbine, the method including;
   determining blade load data associated with a selected rotor blade pair;
   determining, based on the blade load data, pitch imbalance data associated with the selected rotor blade pair, wherein the pitch imbalance data associated with a rotor blade pair is based on measurements of at least blade loading, rotor speed and wind speed; and
   determining and applying pitch control inputs to one or both of the selected rotor blade pair in order to reduce the severity of the rotor imbalance.

The invention extends to, and therefore embraces, a wind turbine system comprising a rotor including plurality of rotor blades, each of the rotor blades being equipped with blade load sensing means and a blade pitch control means, the system further comprising a controller configured to:
   use the blade load sensing means to determine blade load data associated with a selected pair of the plurality of rotor blades;
   determine, based on the blade load data, pitch imbalance data associated with the selected rotor blade pair, wherein the pitch imbalance data associated with a rotor blade pair is based on measurements of at least blade loading, rotor speed and wind speed; and
   determine and apply pitch control inputs to the pitch control means of one or both of the selected rotor blade pair in order to reduce the severity of the rotor imbalance.

Beneficially, the invention provides a 'model-based' approach to diagnosing, and correcting for, the aerodynamic imbalance of the rotor blades based on blade load data. Wind turbines are typically equipped with suitable sensing systems to measure the load (i.e. bending moment) experienced by the blades so the invention is able to be retrofit onto installed wind turbine systems without any, or at least minimal, further instrumentation. Furthermore, by identifying the imbalance in pitch between a pair of blades, suitable adjustments to blade pitch can be made that are independent of the azimuth angle of the rotor.

The invention involves estimating the pitch imbalance between pairs of blades. So, the invention may include determining blade load parameters associated with each of the selected rotor blade pair and, moreover, determining the difference in the blade load parameters associated with each selected rotor blade pair.

For accuracy of the model-based approach, it is preferred that the step of determining blade load data includes acquiring a blade load data set associated with each blade of the selected rotor blade pair during conditions in which the rotor speed is substantially constant. In practice, a precisely constant rotor speed is not achievable, so it is preferred that the rotor speed is maintains within +/−10% of a target speed and, more preferably, within +/−5% of a target speed.

Similarly, for the purposes of accuracy of the model-based approach, it is preferred that the data acquisition occurs during conditions in which the wind speed is substantially constant, for example, constant to within +/−10% or, more preferably, to within +/−5%.

In one embodiment, the acquisition of blade load data may take place during circumstances where the rotor blades have a pitch angle that is set substantially to 0°. Such a measure minimises the thrust force on the blades so that different in thrust between the blades can be assumed to be attributable to pitch imbalance.

In an alternative approach to data acquisition, the blade load data may be acquired in circumstances where the respective blade is near to the 0° and 180° positions. In these circumstances, the contribution of gravity on the blade flap loads can be assumed to be negligible, so that differences in blade loading can be attributed to pitch imbalance only.

In one embodiment, a checking step may be implemented prior to the step of determining and applying pitch control inputs to ensure that the pitch imbalance data associated with the selected rotor blade pair exceeds a predetermined threshold. Therefore, such a measure ensures that the blade pitch is only adjusted when the imbalance between the blades is judged to be unacceptable.

A further checking step may be implemented following the step of determining and applying pitch control inputs, in which the steps of i) determining blade load data associated with a selected rotor blade pair; and ii) determining, based on the blade load data, pitch imbalance data associated with the selected rotor blade pair; in order to check that the severity of the rotor imbalance has been reduced. Therefore, this measure provides confirmation that the control inputs have had the desired effect of reducing the severity of the aerodynamic imbalance on the rotor.

DESCRIPTION OF EMBODIMENTS OF THE INVENTION

It is an aim of the invention to provide a facility to determine whether a rotor imbalance condition exists and, furthermore, to apply corrective inputs to reduce the severity of the rotor imbalance.

Figure 1:
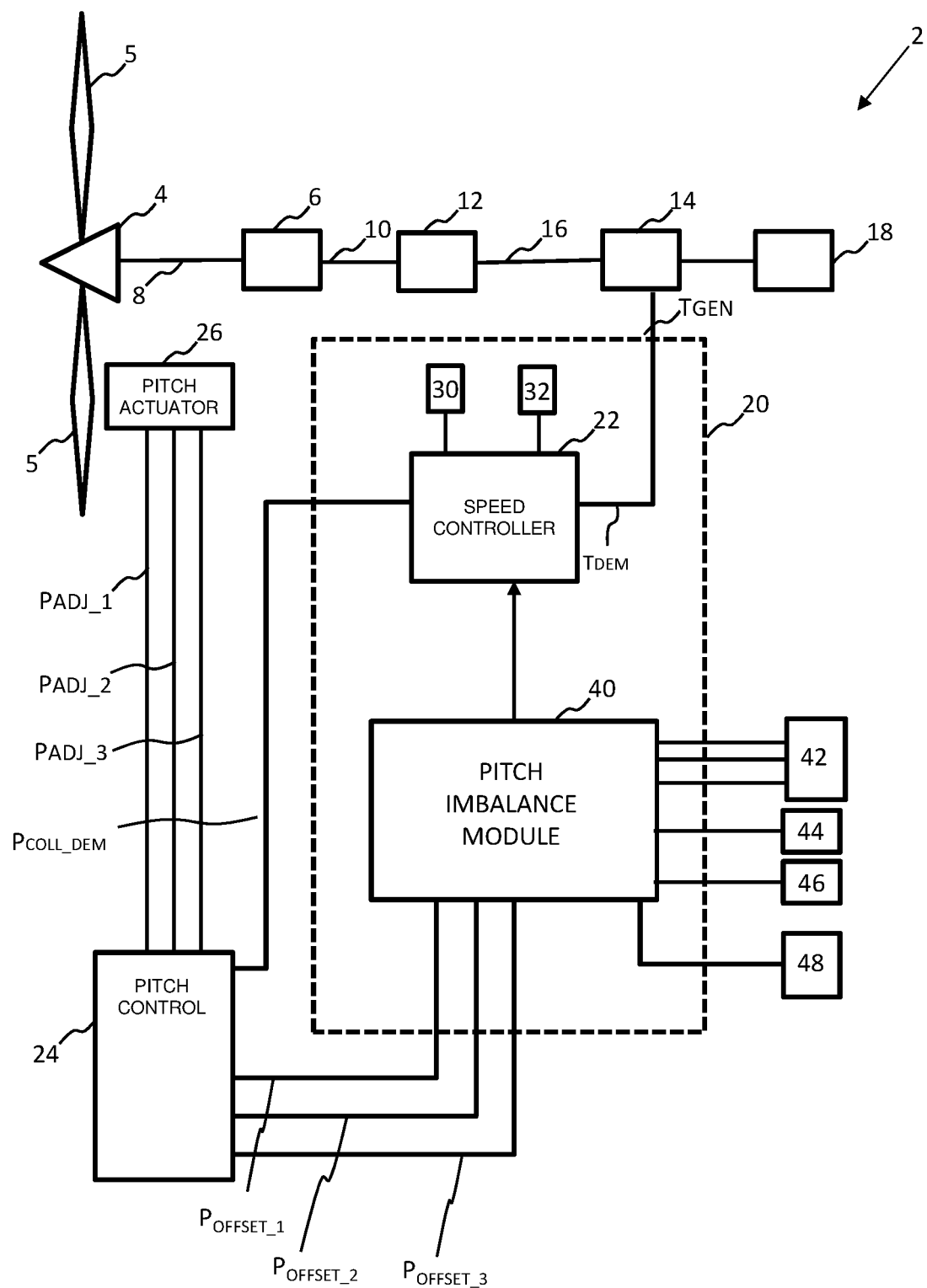
FIG. 1 is a schematic view of a wind turbine system.

FIG. 1 illustrates an example of a technical architecture for the invention. Represented schematically as a system diagram the wind turbine or 'wind turbine system' 2 includes features that are significant for this discussion, but it should be appreciated that many other conventional features that are common to wind turbines are not shown here for brevity, for example the nacelle, tower, control network, power distribution network and so on. However, the skilled person would understand that these features are implicit. Also it should be noted that the specific architecture of the wind turbine system is as an example only so as to illustrate the technical functionality of the invention, and so the invention may be implemented by a system having a different specific architecture.

In this embodiment of the invention, the wind turbine system 2 includes a rotor 4 having a set of blades 5 which drives a gearbox 6 by way of an input shaft 8. The rotor 4 is a three bladed rotor in this embodiment, which is a common rotor configuration, but other blade numbers are of course possible. Although a gearbox 6 is shown here, it is also known for wind turbines to have a direct-drive architecture which does not include a gearbox. The gearbox 6 has an output shaft 10 which drives a generator 12 for generating electrical power. Three phase electrical power generation is usual in utility scale wind turbine systems, but this is not essential for the purpose of this discussion.

The generator 12 is connected to a frequency converter 14 by a suitable three-phase electrical connector such as a cable or bus 16. The frequency converter 14 is of conventional architecture and, as is known, converts the output frequency of the generator 12 to a voltage level and frequency that is suitable for supplying to the grid 18. Various frequency converter architectures are known in the art and the particular type selected is not central to the invention and so will not be described here in detail.

Although fixed-speed wind turbines are appropriate for wind turbines having a comparatively low power output, for example of below 1 MW, in this embodiment the wind turbine system 2 is able to operate at variable speed so as to be more efficient at capturing energy from the wind at a wind range of wind speeds. The invention is, however, also suitable for use in a fixed-speed wind turbine.

As is known, variable-speed wind turbines typically operate under two main control strategies: below-rated power and above-rated power. The term 'rated power' is used here in its accepted sense to mean the power output at which the wind turbine system is rated or certified to produce under continuous operation. Similarly, the use of the term 'rated wind speed' should be understood to mean the lowest wind speed at which the rated power of a wind turbine is produced.

Below rated power occurs at wind speeds between the cut-in speed and rated wind speed which, typically, is between 10 and 17 m/s. In this operating region, the wind turbine system 2 is operable to control the rotor speed so as to maximise the energy captured form the wind. This is achieved by controlling the rotor speed so that the tip speed ratio is at an optimum value, namely between 6 and 7. To control the rotor speed, the wind turbine system 2 is provided the facility to control the generator torque so as to track a power reference, as will be described.

Above-rated power occurs when the wind speed has increased to, or has exceeded, the rated wind speed. In this operating condition, the objective of the wind turbine system 2 is to maintain a constant output power. This is achieved by controlling the generator torque to be substantially constant, so as to track a constant power reference, but varying the pitch angle of the blades which adjusts the resulting lift and drag force of the blade in the rotor plane. This will slow down the turbine's rotational speed or the torque transferred to the rotor shaft so that the rotational speed, and also the generated power of the system, is kept substantially constant.

Referring again to FIG. 1, in order to achieve the below-rated power and above-rated power control objectives, the wind turbine system 2 is equipped with a control system 20. The control system 20 includes a speed controller 22 which is operable to control the frequency converter 14 to influence the torque exerted on the rotor 4 by the generator 12, and also to control the pitch of the blades 5 through a blade pitch adjustment system comprising a pitch control module 24 and a pitch actuation module 26.

It should be noted at this point that the architecture of a wind turbine speed control system that acts through power electronics such as a frequency converter to control generator power, and thereby the reaction torque on the rotor via the gearbox 6, and also acts through a pitch control system to control the pitch angle of the blades is generally known in the art, so a detailed description of the electronic architecture will not be given here.

The speed controller 22 receives a plurality of control inputs, but two input parameters are shown specifically here: a rotor speed input parameter 30 which is provided by a suitable rotor speed sensing means, and a demanded power input parameter 32 or 'power reference' which is provided by a higher level controller (not shown) of the wind turbine system 2 either directly to the speed controller 22 or through a data distribution network based on a suitable protocol, such as Ethernet.

The speed controller 22 is operable to control the generator torque, which is associated with, and calculated from, the power reference, by outputting a demanded torque signal $T_{DEM}$ to the frequency converter 14 during below-rated power operating condition in order to minimise the error between the rotor speed input parameter 30 and the speed reference 32 and, therefore, to track the power reference. Similarly, at operating conditions above-rated power, the speed controller 22 is operable to hold the generator torque constant (and, therefore to track the constant power reference) but to provide a control input to the pitch control module 24 to modulate, collectively, the pitch angles of all three blades 5 of the rotor 4. The pitch control module 24 receives the control input from the speed controller, shown here as $P_{COLL\_DEM}$ and converts this into a pitch angle adjustment value for each of the blades 5. The pitch angle adjustment signals are shown here as $P_{ADJ\_1}$ $P_{ADJ\_3}$ and $P_{ADJ\_3}$ that represent values for a three bladed rotor. These control inputs are fed to the pitch actuation module 26 which controls the pitch actuating motors for the respective blades 5.

As will be appreciated from the above discussion, the wind turbine system 2 is provided with a facility to control the rotor speed during a wide range of wind speeds in order to optimise the power generation of the system. The rotor speed can be controlled through a range of speeds, or controlled to remain at a fixed speed. As the rotor rotates, differences in blade-to-blade pitch can lead to rotor imbalance which applies cyclical forces to various components of the wind turbine, for example on the nacelle and tower, and on the running gear and generating equipment within the nacelle. To address this problem, the wind turbine system 2 includes a pitch imbalance module 40 that is operable to collect data from the wind turbine system and to evaluate the pitch imbalance between the blades 5. In evaluating the pitch imbalance the pitch imbalance module 40 is also operable to apply blade pitch offset values to the pitch control module 24 in order to adjust the pitch of the blades individually in order to reduce the severity of the rotor imbalance. In reducing the severity of the rotor imbalance, the system compensates for the aerodynamic influences affecting the blades and therefore improves the rotating balance of the rotor. As a result of this, the cyclical forces applied by the rotor onto the supporting components of the wind turbine, such as the main rotor bearing, gearbox, generator, nacelle structure and tower, are reduced.

Notably, the pitch imbalance module 40 is operable to determine the pitch imbalance between the blades based on data that it collects about the loading on the blades as the rotor rotates. To this end, the pitch imbalance module 40 is configured to receive input data from various sensors so that it can carry out the blade pitch imbalance determination. Specifically, the module 40 receives three blade load data inputs from a blade load monitoring module 42, a rotor speed signal 44 and a wind speed signal 46. As such, therefore, the pitch imbalance module 40 therefore determines pitch imbalance data associated with a rotor blade pair based on measurements of blade loading, rotor speed and wind speed, as will be described in more detail later. Optionally, and as will become apparent from the following discussion, the module 40 may also receive a rotor position signal 48. This may be from a specific rotor position sensor or may be derived from the rotor speed signal, or vice versa.

By analysing the blade load data that it collects, the pitch imbalance module 40 is operable to determine pitch imbalance data between selected pairs of the rotor blades, as will be described. Once the pitch imbalance data has been determined, the pitch imbalance module 40 is operable to determine pitch control inputs that may be applied to the selected pair of blades in order to reduce the rotor imbalance, and to apply those pitch control inputs via the pitch control module 24. To this end, the pitch imbalance module 40 outputs three blade pitch offset values, indicated here as $P_{OFFSET\_1}$, $P_{OFFSET\_2}$, and $P_{OFFSET\_3}$.

Beneficially, since it is routine to instrument wind turbine blades to provide blade load data, the pitch imbalance module 40 can be retrofit to an installed wind turbine in order to use existing data sources to determine an estimate of pitch imbalance and to take corrective action to adjust the blade pitch when the wind turbine is operating. Therefore, this avoids a costly and time consuming exercise of performing a dedicated diagnostic procedure in an offline setting, which may require additional sensor suites to be fitted to the wind turbine. A further benefit of the invention is that by correcting the effective pitch angle difference between the blades, any rotor imbalance that is attributable to the difference in pitch angle will be resolved at source, rather than by applying cyclical pitch adjustments to generate a rotating thrust force to counter the rotor imbalance. Following the latter approach may result in increased pitch actuator activity and may also compromise optimal energy production since it will affect the ability of the pitch control system to set the blades in the optimum pitch position for maximum thrust and, therefore, maximum rotor torque.

The procedure by which the pitch imbalance module 40 determines pitch imbalance from blade load data will now be explained in more detail.

The pitch imbalance module implements an algorithm that calculates an estimate of the pitch imbalance between a selected pair of blades based on the difference between the load experienced by the selected pair of blades, more specifically the blade flap load. The equation is provided below:

$$\Delta_{AB,est} = \frac{E[M_{BA}] - E[M_{BB}]}{k_2 \cdot (k_3 \cdot E[V^2] + k_4 \cdot E[\omega_r^2])} \quad [1]$$

In the above equation:

$\Delta_{AB,est}$ is a value for the estimated pitch imbalance between blades A and B.

$E[M_{BA}]$ is the expected, or mean, value of the blade flap moment on blade A associated with a blade flap moment data set.

$E[M_{BB}]$ is the expected, or mean, value of the blade flap moment on blade B associated with a blade flap moment data set.

$K_2$, $K_3$ and $K_4$ are constant values, which are explained later, $W_r$ is the rotational speed of the rotor V is the wind speed The derivation of equation [1] will now be described.

Figure 5:
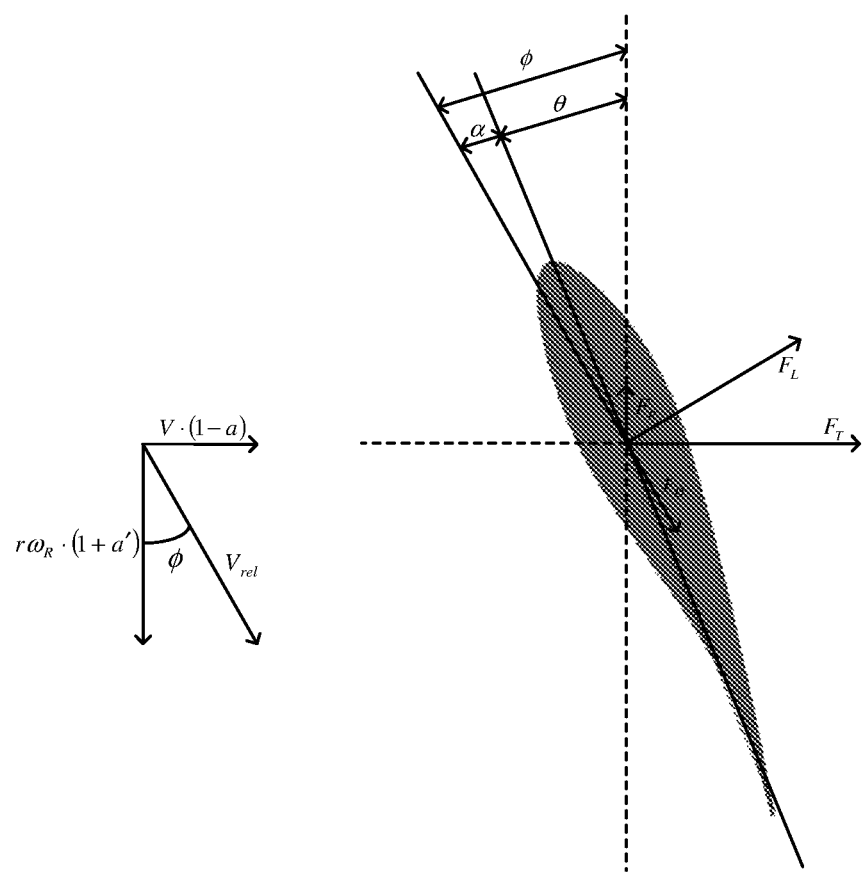
FIG. 5 is a diagrammatic illustration of variables used in a blade imbalance algorithm of an embodiment of the invention.

From the blade element momentum method, as would be understood by the skilled person, the axial thrust force on a given section of a blade can be expressed as follows:

$$F_T = \frac{\rho c}{2} V_{rel}^2 (C_L(\alpha) \cdot \cos(\phi) + C_D(\alpha) \cdot \sin(\phi)) \quad [2]$$

where:

$$\phi = \alpha + \theta$$

$$V_{rel}^2 = \sqrt{(V \cdot (1-a))^2 + (r\omega_r \cdot (1+a'))^2}$$

and where

α: Angle of attack

θ: Pitch angle a: Axial induction factor a': Tangential induction factor r: Radius from the root of the blade to the blade section of concern $\omega_r$: Rotational speed $C_L$: Lift coefficient $C_D$: Drag coefficient $V_{rel}^2$: Relative wind speed V: Upstream wind speed ρ: Air density c: Blade chord length at blade section of concern Note that the above variables would be known to the skilled person from standard texts on the subject of wind turbine blade theory and are also illustrated diagrammatically in FIG. 5.

Equation [2] can be simplified by making certain assumptions. For example, if the wind turbine is operated in a 'non-stall' condition, as would be understood by the skilled person, then the contribution of aerodynamic drag on the blade can be assumed to be insignificant and the lift function can be assumed to be linear. As a result, equation [2] can be modified as follows:

$$F_T \approx k_1 \cdot V_{rel}^2 \cdot C_L(\alpha) \quad [3]$$

which, with the lift coefficient function approximated to a linear function, can be further modified to:

$$F_T \approx k_1 \cdot V_{rel}^2 \cdot (a_L \alpha + b_L), \; a_L > 0 \quad [4]$$

In equation [4], $$k_1 = \frac{\rho c}{2} \cdot \cos(\phi)$$

can be assumed to be constant because the air density and chord length can be assumed to be constant, as is φ, which is the sum of the blade pitch angle and the angle of attack.

So, to recap, equation [4] provides an expression for the thrust force on the blade. The thrust force can be modelled as a point force 'F' on the blade at a radius 'r' from the centre of the rotor. From this, it can be assumed that the blade load or 'blade flap load' is proportional to the axial thrust force under certain conditions.

Figure 3:
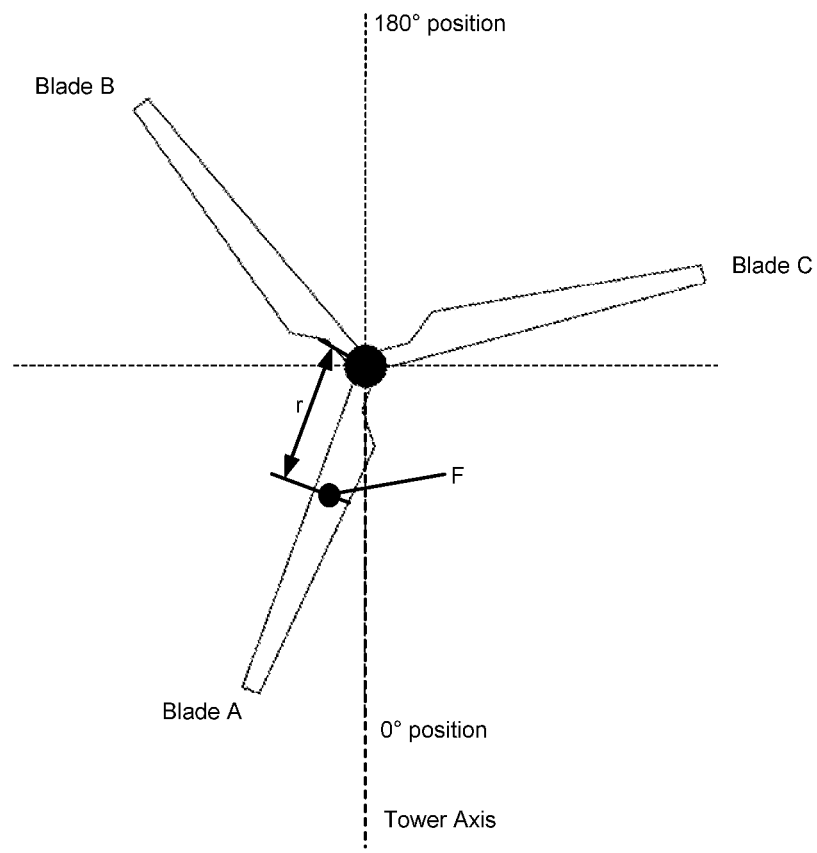
FIG. 3 is a view of a three-bladed rotor and which indicates a 0° azimuth position.
Figure 4:
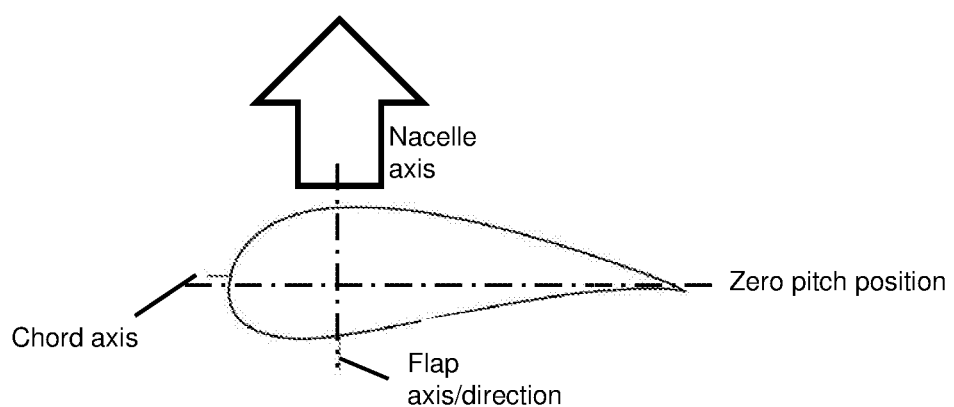
FIG. 4 is an illustrative view of a blade profile indicating a flap load direction and a zero pitch position of the blade.

Blade flap load usually has two contributing factors: firstly the axial thrust force and, secondly, the force due to gravity acting on the blade thereby generating a bending moment in the blade flap direction, as indicated in FIG. 4. However, this gravitational influence on the blade can effectively be ignored in the following circumstances:

1) When the blade is near to the 0° or 180° azimuth positions—in these positions, gravity acts along the blade axis and so the blade does not experience an appreciable bending moment due to gravity in the flap direction, as is illustrated in FIG. 3.

2) When the pitch of the blade is close to 0°—at pitch angles close to 0°, the blade does not experience an appreciable bending moment due to gravity in the flap direction since gravity acts substantially along the chord axis of the blade, as is illustrated in FIG. 4.

So, when the effects of gravity on blade load are ruled out, it can be adduced that under these conditions differences in the axial thrust force on the blades are the result of difference, or 'imbalance' in the pitch between the blades. It is worth noting that factors such as dirt/ice accumulation, differences in blade profile, and so on, that may influence aerodynamic balance are considered negligible compared to the aerodynamic imbalance due to differences in pitch angle. Nevertheless, the invention would also serve to correct for any such aerodynamic influences.

Taking two of the three blades as an example, the pitch imbalance between blade A and blade B, "$\Delta_{AB}$" can be expressed in the following equation:

$$\Delta_{AB} = \alpha_A - \alpha_B \quad [5]$$

Where $\alpha_A$ is the angle of attack of blade A and where $\alpha_B$ is the angle of attack of blade B Equation [5] can be inserted into equation [4] to provide expressions for the thrust force for a selected pair of blades, in this case blade A and blade B, respectively:

$$F_{TA} \approx k_1 \cdot V_{rel}^2 \cdot (a_L \alpha_A + b_L) \quad [6]$$

$$F_{TB} \approx k_1 \cdot V_{rel}^2 \cdot (a_L (\alpha_A - \Delta_{AB}) + b_L) \quad [7]$$

So, with these expressions, an expression for the difference in blade thrust between blades A and B can be derived:

$$F_{TA} - F_{TB} \approx k_1 \cdot V_{rel}^2 \cdot a_L \cdot \Delta_{AB} \quad [8]$$

Using the blade thrust model referred to above that the force on the blade can be approximated to a force acting on a point that is located a radius 'r' from the blade root, it is possible to modify equation [8] to derive an expression of the difference in blade flap moment parameters.

$$M_{BA} - M_{BB} \approx k_2 \cdot V_{rel}^2 \cdot \Delta_{AB} \quad [9]$$

In equation [9] the parameter $k_2$ is a constant, where $k_2 = k_1 \cdot r \cdot a_L$ Using equation [9] and combining this with the expression $V_{rel}^2 = \sqrt{(V \cdot (1-\alpha))^2 + (r\omega_r \cdot (1+\alpha'))^2}$ as discussed above, and taking mean values of blade flap moment and $V_{rel}^2$ using the 'Expected operator', as would be known to the skilled person, equation [9] can be rewritten as:

$$E[M_{BA}] - E[M_{BB}] \approx k_2 \cdot \Delta_{AB} \cdot E[(V \cdot (1-\alpha))^2 + (r\omega_r \cdot (1+\alpha'))^2] \quad [10]$$

Measures can be taken to simply equation [10]. Here, it is possible to assume that the axial and tangential induction factors, α and α' respectively, are constant, and so equation [10] can be modified to:

$$E[M_{BA}]-E[M_{BB}] \approx k_2 \cdot \Delta_{AB} \cdot (k_3 \cdot E[V^2]+k_4 \cdot E[\omega_r^2]) \quad [11]$$

In equation [11]:
$k_3=(1-\alpha)^2$; and
$k_4=(1+\alpha')^2 \cdot r^2$

Thus, equation [11] provides a means to calculate the difference in blade flap moment between two blades, specifically blades A and B in this example. It should be noted that the same equation may be used to determine the difference in blade flap moment between any selected pair of blades of the rotor.

Assuming that the wind speed and rotor speeds remain relatively constant, equation [11] can be used to estimate the pitch imbalance between the selected pair of blades. Thus, rearranging equation [11] provides:

$$\Delta_{AB,est} = \frac{E[M_{BA}]-E[M_{BB}]}{k_2 \cdot (k_3 \cdot E[V^2]+k_4 \cdot E[\omega_r^2])} \quad [12]$$

$K_3$ is a constant parameter that is dependent on the axial induction factor, and is therefore dependent on the mean wind speed. Since the mean wind speed can be assumed to be substantially constant during a period for which the data will be sampled, so is the axial induction factor $K_4$ is a constant parameter that is dependent on the tangential induction factor, and is therefore dependent on the mean rotor speed, which also can be assumed to be relatively constant over a period for which the data will be sampled.

The values of $k_3$ and $k_4$ are calculated during an offline process, or from rotor simulations, where values for the tangential and axial induction factors can be determined.

However, due to the $r^2$ term in $k_4$, equation [12] is envisaged to be more sensitive to variations in rotor speed and less sensitive to variations in the wind speed. So, it is envisaged that equation [12] provides a robust algorithm for determining the blade pitch imbalance between a selected pair of blades if it is carried out in conditions that the angular velocity of the rotor is maintained at a substantially constant speed. It is envisaged that acceptably accurate results will be achieved with the rotor speed is maintained within +/-10% of a target speed. However, ideally the rotor speed should be maintained within tighter bounds, for example +/-5% although these values are provided by way of example and should not be considered limiting. As for the wind speed, it is envisaged currently that acceptable results would be achieved by carrying out the process whilst the wind speed is substantially constant within +/-25% although, preferably, a smaller variation in wind speed would be ideal for example within +/-10% or +/-5%.

Having described the theory that underpins how the pitch imbalance between a selected pair of blades can be estimated based on blade flap loading, the discussion will now move on to how this may be achieved in practice.

Figure 2:
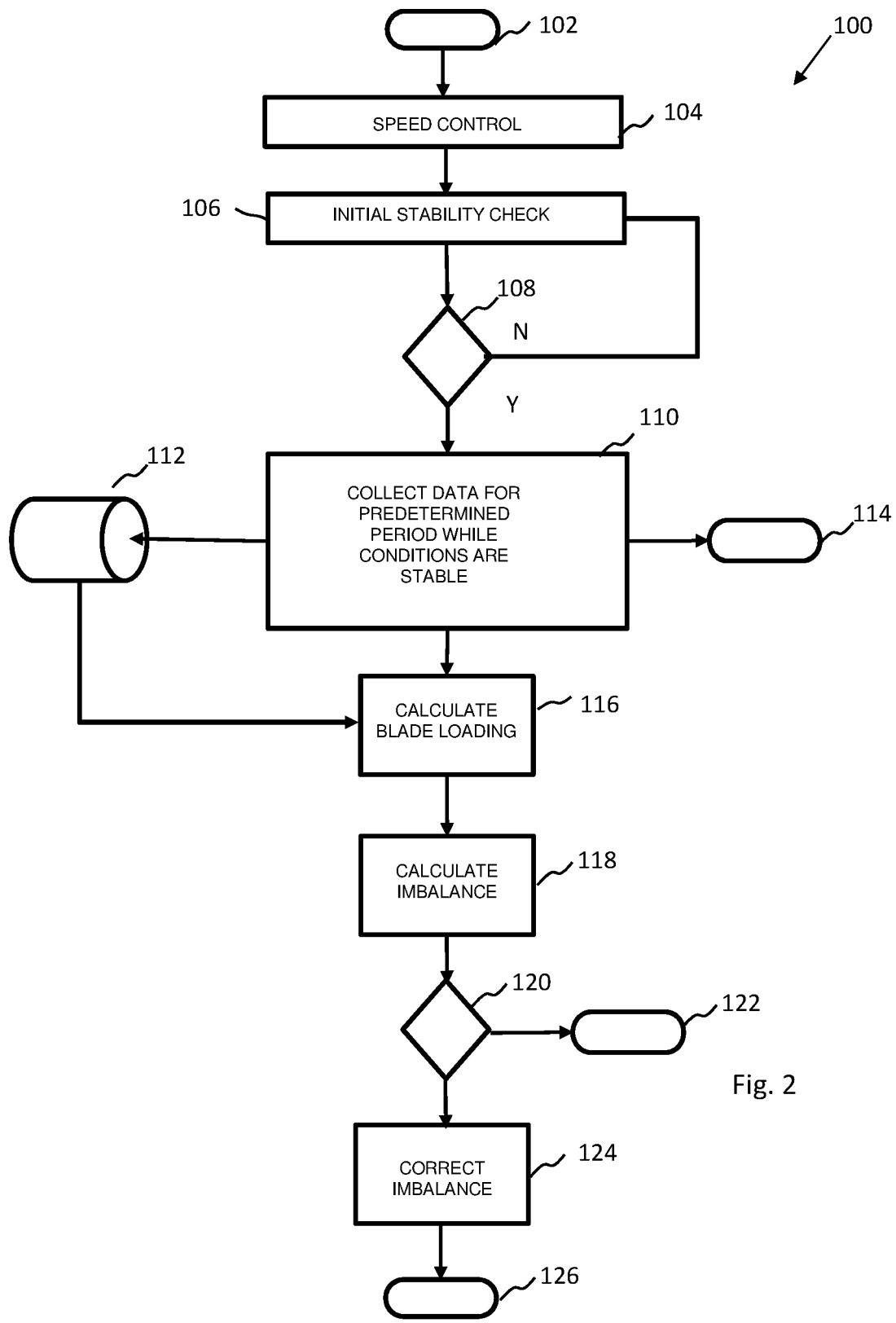
FIG. 2 is a process diagram illustrating a strategy for determining and correcting rotor imbalance.

Referring now to FIG. 2, a pitch imbalance determination process 100 is shown which is implemented in this embodiment by the pitch imbalance module 40. Note that although the functionality of the pitch imbalance module 40 is shown as separated from other functional components/modules of the wind turbine system, it will be understood that this is for descriptive purposes only.

The process initiates at step 102 which may represent the process/function being called from a broader control process of the wind turbine system. The process 100 may be configured to be carried out on a preset time schedule, for example every 100 operating hours, or the process may run on demand, for example when triggered by operating personnel during commissioning or in response to certain events, for example a lightning strike or a heavy snowfall.

Once the process 100 has been initiated, step 104 acts to control the speed of the wind turbine so that it is maintained at a substantially constant value. Once the rotor speed has been controlled to the desired speed, steps 106 and 108 act as an initial monitoring loop to check that the rotor speed and also the wind speed are stable before a data collection phase begins. The stability checking step 106 continues around the loop until such time as the rotor speed and wind speed are determined to be sufficiently stable. Alternatively, the stability checking step 106 could be configured to timeout after a predetermined period. As an example of this, the initial stability check may be configured to ensure that the rotor speed and wind speed are stable over a time period of 30 seconds. For example, the rotor speed is checked that it does not vary more than +/-10% over that time period and the wind speed is checked that it does not vary more than +/-25% over that time period.

Once the initial stability conditions have been satisfied, the process 100 starts a data collection phase, as indicated by step 110. The purpose of the data collection phase is to acquire a blade loading data set for each of blade A, blade B and blade C. The blade loading data set would comprise measurements of the blade bending moment sampled during a sampling period at a certain sampling rate. The blade bending moment is derived from suitable blade strain sensors that are preferably positioned at the root of the blade in question and so serve to provide suitable data inputs from the blade load monitoring module 42, as described above with reference to FIG. 1.

The data would be collected for a period that is long enough to ensure that the mean value of the blade loading is sufficiently accurate. In principle, the longer the data is collected, the more accurate the mean value would be. However, a longer data collection period risks the wind speed and rotor speed becoming unstable. In practice, it is envisaged that a suitable data collection period would be 30 minutes at a sampling rate of 10 Hz although it should be understood that these figures are provided by way of example only.

During the data collection phase, the process 100 continues to monitor the wind speed and the rotor speed. If either of these parameters becomes unstable, then the data collection step 110 terminates at step 114.

Once the data collection phase completes, the data sets are stored in a suitable memory module 112. This may be a general memory area of the control system, or a memory area dedicated to the pitch imbalance module 40, for example.

Once the data collection phase completes, step 116 processes the acquired blade loading data sets from the memory 112 and calculates the mean blade flap load values for each of blades A, B and C. Following this, step 118 then uses the mean blade flap load values and calculates the blade pitch imbalance using equation [12] for each blade pairs, that is to say, blade pair AB, blade pair BC, and blade pair AC.

Once the pitch imbalance values have been calculated at step 118, a check is made at step 120 that the pitch imbalance values exceed a predetermined threshold. If the pitch imbalance values are within the predetermined threshold, the rotor is considered to be acceptably balanced, and the process will terminate at step 122. However, if one or more of the pitch imbalance values are considered to exceed the predetermined threshold, then the process continues to step 124 at which the pitch for each blade is corrected. Steps 118 and 124 will now be explained using a worked example to aid understanding.

In this example, it is assumed that the following blade pitch imbalance values have been determined:

$\Delta PITCH_{AB}=0.6°$ $\Delta PITCH_{AC}=1.0°$ $\Delta PITCH_{BC}=0.4°$

From these values, it can be appreciated that the angle of attack of blade A ($\alpha A$) is greater than the angle of attack of blade B ($\alpha B$), that the angle of attack of blade A is greater than the angle of attack of blade C ($\alpha C$), and that the angle of attack of blade B is greater than the angle of attack of blade C. Expressed another way: $\alpha A > \alpha B > \alpha C$. More specifically, in this worked example $\alpha A=2°$, $\alpha B=1.4°$ and $\alpha C=1°$.

The difference in the angle of attack for the blades gives rise to the aerodynamic imbalance and can be corrected by adjusting the pitch angle of the blades. From these pitch imbalance values for each of the three blade pairs, it can be assumed that the pitch of blade B is 'correct' since this gives the median angle of attack of the three blades. Therefore, it follows that the pitch angles of blade A and blade B should be compensated or 'offset' by the pitch imbalance values $\Delta PITCH_{AB}=0.6°$ and $\Delta PITCH_{BC}=-0.4°$ respectively.

So, in this embodiment, step 124 results in the pitch imbalance module 40 outputting pitch offset values of 0.6° for blade A and −0.4° for blade C. In response to this, the pitch control module 24 revises the pitch adjustment signals for the blades to take into account the blade pitch offset values it receives from the pitch imbalance module 40. In this example, the pitch control module 24 revises the pitch adjustment values as follows:

$P_{ADJ\_1}=P_{COLL\_DEM}+\Delta PITCH_{AB}$ $P_{ADJ\_2}=P_{COLL\_DEM}$ $P_{ADJ\_3}=P_{COLL\_DEM}-\Delta PITCH_{BC}$ Once the offset signals are output to the pitch control module 24, the process 100 terminates at step 126.

An option here is for the process to be called again almost immediately so as to ensure that the adjustments that have been made to the blade pitch angles have had the desired effect of reducing the severity of the blade pitch imbalance between the blades.

The skilled person would appreciate that various modifications may be made to the specific embodiments discussed above without departing from the inventive concept as defined by the claims.

For example, in the above embodiment the blade flap load data is acquired as the rotor rotates throughout a 360 degree cycle. As has been discussed above, during the data collection phase the pitch of the blades is reduced substantially to 0 degrees which has the effect of removing the influence of gravity on the blade flap load. As an alternative to this, it is acceptable to allow the pitch angles to adopt any commanded position, but then only collect data when the blades are near to the 0 degree or 180 degree positions, for example around +/−10 degrees around these positions. This would also have the effect of removing the influence of gravity from the blade flap load data.

What is claimed is:

1. A method of improving balance of a rotor of a wind turbine, the method including:
   selecting a rotor blade pair from a plurality of rotor blades coupled to the rotor;
   receiving blade load data associated with each of the plurality of rotor blades, the blade load data comprising:
   a blade loading of each of the plurality of rotor blades,
   a speed of the rotor, and
   a wind speed;
   determining a pitch imbalance of the rotor associated with the selected rotor blade pair, the pitch imbalance based on a difference between blade load data associated with the selected rotor blade pair and blade load data associated with another rotor blade pair of the plurality of rotor blades; and
   determining and applying pitch control inputs to one or both rotor blades of the selected rotor blade pair to reduce the pitch imbalance of the rotor.

2. The method of claim 1, wherein determining the pitch imbalance associated with the selected rotor blade pair is provided by:

$$\Delta_{AB,est} = \frac{E[M_{BA}] - E[M_{BB}]}{k_2 \cdot (k_3 \cdot E[V^2] + k_4 \cdot E[\omega_r^2])}.$$

3. The method of claim 1, including determining the blade load data associated with two or more selected rotor blade pairs.

4. The method of claim 1, wherein determining the blade load data includes acquiring a blade load data set associated with each blade of the selected rotor blade pair during conditions in which a rotor speed is substantially constant.

5. The method of claim 4, wherein the rotor speed is maintained within +/−10% of a target speed.

6. The method of claim 4, wherein the rotor speed is maintained within +/−5% of a target speed.

7. The method of claim 4, wherein determining the blade load data includes acquiring a blade load data set associated with each blade of the selected rotor blade pair during conditions in which the wind speed is constant to within +/−25%.

8. The method of claim 4, wherein determining the blade load data includes acquiring a blade load data set associated with each blade of the selected rotor blade pair during conditions in which the wind speed is constant to within +/−10%.

9. The method of claim 1, further including, before the step of determining and applying pitch control inputs, checking that the pitch imbalance associated with the selected rotor blade pair exceeds a predetermined threshold.

10. A wind turbine system comprising a rotor having a plurality of rotor blades, each of the rotor blades being equipped with blade load sensing means and a blade pitch control means, the system further comprising a controller configured to:
   select a rotor blade pair from the plurality of rotor blades;
   receive blade load data associated with each of the plurality of rotor blades, the blade load data comprising:
   a blade loading of each of the plurality of rotor blades,
   a speed of the rotor, and
   a wind speed;
   determine a pitch imbalance of the rotor associated with the selected rotor blade pair, the pitch imbalance based on a difference between blade load data associated with the selected rotor blade pair and blade load data associated with another rotor blade pair of the plurality of rotor blades; and determine and apply pitch control inputs to one or both rotor blades of the selected rotor blade pair to reduce the pitch imbalance of the rotor.

* * * * *